United States Patent
Wattron et al.

(10) Patent No.: US 6,381,935 B1
(45) Date of Patent: May 7, 2002

(54) CUTTING MACHINE COMPRISING A CUTTING DEVICE CONNECTED TO A CHASSIS BY MEANS OF AN IMPROVED CONNECTING DEVICE

(75) Inventors: Bernard Wattron, Haegen; Martin Walch, Dettwiller, both of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/544,640

(22) Filed: Apr. 5, 2000

(30) Foreign Application Priority Data

Apr. 16, 1999 (FR) .............................. 99 04928

(51) Int. Cl.⁷ .......................... A01D 34/64; F16C 11/00
(52) U.S. Cl. ......................... 56/14.9; 56/206; 403/132; 403/228
(58) Field of Search ................. 56/14.9, 15.9, 56/208, 228, DIG. 14; 403/120, 132, 133, 135, 225, 228

(56) References Cited

U.S. PATENT DOCUMENTS

| | | | |
|---|---|---|---|
| 3,053,556 A | * | 9/1962 | Klocke et al. ............. 403/138 |
| 3,288,500 A | * | 11/1966 | Hamel ..................... 403/228 |
| 3,501,184 A | * | 3/1970 | Van Winsen et al. ....... 403/133 |
| 3,945,737 A | * | 3/1976 | Herbener .................. 403/132 |
| 4,177,625 A | * | 12/1979 | Knight et al. ............... 56/208 |
| 4,286,423 A | * | 9/1981 | Caldwell et al. ............ 56/15.9 |
| 4,610,128 A | | 9/1986 | Ermacora et al. |
| 4,669,256 A | | 6/1987 | Ermacora et al. |
| 4,694,640 A | | 9/1987 | Ermacora et al. |
| 4,714,123 A | | 12/1987 | Ermacora et al. |
| 4,719,742 A | | 1/1988 | Ermacora et al. |
| 4,720,964 A | | 1/1988 | Ermacora et al. |
| 4,723,396 A | | 2/1988 | Ermacora |
| 4,763,463 A | | 8/1988 | Ermacora et al. |
| 4,771,591 A | | 9/1988 | Ermacora et al. |
| 4,811,553 A | | 3/1989 | Ermacora et al. |
| 4,833,868 A | | 5/1989 | Ermacora et al. |
| 4,848,069 A | | 7/1989 | Ermacora et al. |
| 4,947,629 A | | 8/1990 | Ermacora et al. |
| 4,986,064 A | | 1/1991 | Ermacora |
| 4,991,383 A | | 2/1991 | Ermacora |
| 5,060,462 A | | 10/1991 | Helfer et al. |
| 5,094,063 A | | 3/1992 | Wattron et al. |
| 5,107,663 A | | 4/1992 | Wattron et al. |
| 5,136,828 A | | 8/1992 | Ermacora |
| 5,199,249 A | | 4/1993 | Wattron et al. |
| 5,199,250 A | | 4/1993 | Ermacora et al. |
| 5,282,396 A | * | 2/1994 | Crandall ................... 403/132 |

(List continued on next page.)

FOREIGN PATENT DOCUMENTS

| | | |
|---|---|---|
| EP | 461 492 | 12/1991 |
| EP | 0 634 089 | 1/1995 |
| FR | 2 110 911 | 6/1972 |
| FR | 2 759 531 | 8/1998 |
| FR | 2 759 533 | 8/1998 |

Primary Examiner—Robert E. Pezzuto
Assistant Examiner—Nathan Mammen
(74) Attorney, Agent, or Firm—Oblon, Spivak, McClelland, Maier & Neustadt, P.C.

(57) ABSTRACT

A cutting machine comprising a chassis connected to a vehicle, a cutting device comprising cutting members, a connecting device connecting the cutting device to the chassis in such a way as to allow the cutting device to be brought into a work position and into a transport position and comprising at least two connecting rods each one connected to the cutting device and to the chassis by means of a respective connection, one of the connections being a connection of the ball-joint type. The cutting machine is characterized in that at least one of the connections connecting a connecting rod to the cutting device or to the chassis comprises an elastic element.

14 Claims, 4 Drawing Sheets

U.S. PATENT DOCUMENTS

| | | |
|---|---|---|
| 5,357,737 A | 10/1994 | Ermacora et al. |
| 5,417,042 A | 5/1995 | Walch et al. |
| 5,423,165 A | 6/1995 | Walch et al. |
| 5,507,136 A | 4/1996 | Walch |
| 5,522,208 A | 6/1996 | Wattron |
| 5,597,258 A * | 1/1997 | Kincaid et al. ............. 403/132 |
| 5,660,032 A | 8/1997 | Neuerburg et al. |
| 5,749,390 A | 5/1998 | Ermacora et al. |
| 5,794,424 A | 8/1998 | Ermacora et al. |
| 5,852,921 A | 12/1998 | Neuerburg et al. |
| 5,857,314 A | 1/1999 | Wolff |
| 5,901,533 A | 5/1999 | Ermacora et al. |
| 5,901,537 A | 5/1999 | Walch et al. |
| 5,966,913 A | 10/1999 | Neuerburg |
| 5,992,133 A | 11/1999 | Walch et al. |
| 6,003,291 A | 12/1999 | Ermacora et al. |
| 6,101,796 A * | 8/2000 | Wattron et al. ............... 56/13.6 |
| 6,213,221 B1 * | 4/2001 | Lewallen .......... 172/776 motor |

* cited by examiner-

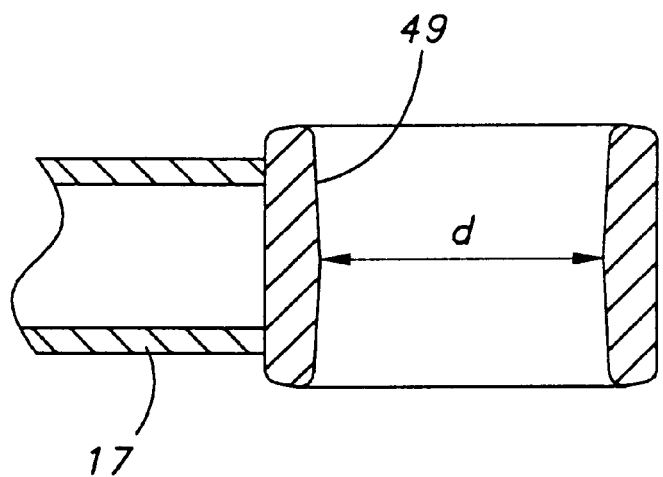
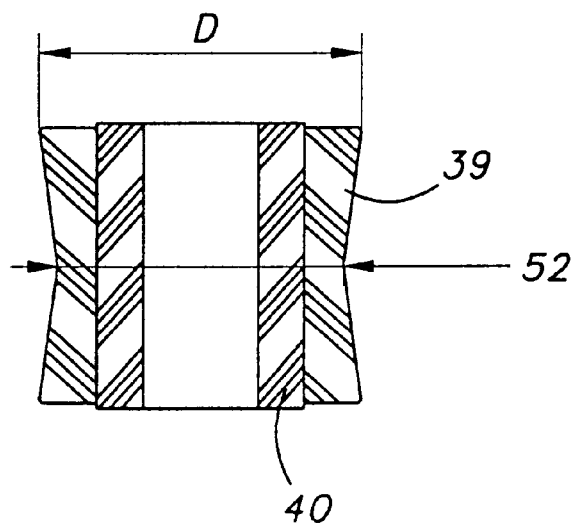

CUTTING MACHINE COMPRISING A CUTTING DEVICE CONNECTED TO A CHASSIS BY MEANS OF AN IMPROVED CONNECTING DEVICE

BACKGROUND OF THE INVENTION

1. Field of the Invention

The present invention relates to a cutting machine comprising:
- a chassis connected to a motor vehicle;
- a cutting device comprising cutting members and intended to occupy:
  - at least one work position in which it rests at least approximately on the ground and in which it is intended to follow the relief of said ground,
  - at least one transport position in which it extends above the ground,
- a connecting device connecting the cutting device to the chassis in such a way as to allow said cutting device to be brought into the work position and into the transport position and comprising at least two connecting rods each one connected to said cutting device and to said chassis by means of a respective connection, one of said connections being a connection of the ball-joint type.

2. Discussion of the Background

A cutting machine of this kind is known from most cutting machines and more specifically from most mowers of the trailed type. Broadly speaking, these known mowers comprise a chassis with wheels intended to be connected to a motor vehicle by means of a drawbar. A cutting device is connected to the chassis by means of a connecting device containing lower connecting rods. Each lower connecting rod is connected, on one hand, to the cutting device by means of a connection of the ball-joint type and, on another hand, to the chassis by means of a connection which is also of the ball-joint type. The connecting rods and the ball-joint connections advantageously allow the cutting device to move relative to the chassis in the work position so as to allow said cutting device to follow the relief of the land. Each ball-joint connection comprises a spherical part guided in a concave part and a lubricating device intended to allow a lubricating film to be introduced between said spherical part and said concave part. To ensure that the cutting device works correctly and to lighten it, it is necessary for the ball joints to be lubricated regularly. The fact that these ball joints are frequently exposed to dust or moisture and thrown-up soil makes it all the more important that they be lubricated.

Each connection also comprises a spindle which passes through the corresponding spherical part and which, by means of an operating device, allows the cutting device to be brought from a work position, in which it rests on the ground, into a transport position in which it extends above said ground, or vice versa.

The devices for lubricating these connections are relatively difficult to access, which means that their lubrication is fairly often neglected.

Such connections of the ball-joint type have to experience a minimum amount of movement to prevent them from seizing up when they have been immobile for too long: the start of the cutting season often witnesses mower cutting devices which are very difficult to manipulate from a transport position into a work position or vice versa and which no longer correctly follow the relief of the land.

SUMMARY OF THE INVENTION

The object of the present invention is to overcome the drawbacks of the cutting machines of the prior art while at the same time seeking to obtain a simple and inexpensive solution.

To this end, the cutting machine according to the invention is characterized in that at least one of the connections connecting a connecting rod to the cutting device or to the chassis comprises an elastic element.

The invention also relates to the following features taken in isolation or in any technically feasible combination:

- the elastic element is made of a natural or synthetic elastomer;
- the connection which comprises an elastic element also comprises a ring to the outside of which the elastic element is fixed and through which a spindle extends;
- the elastic element is fixed to the ring by vulcanizing;
- the ring is made of plastic and the corresponding spindle is made of a rustless material or is surface-coated with a rustless material which advantageously allows the connection always to operate correctly and allows the cutting device to be placed in the work or transport position;
- the connecting rod comprises a bore of biconical shape, inside which the corresponding elastic element extends;
- on its exterior periphery, the elastic element is of biconical shape, approximately complementing the biconical shape of the corresponding bore in the connecting rod, which advantageously allows the said elastic element to be held firmly in the corresponding bore in said connecting rod;
- the bore made in the connecting rod is forged or cast in, which advantageously allows the cost price to be limited;
- the cutting device comprises a first lower lateral end, to the vicinity of which a first lower connecting rod is connected by means of a first connection, and a second lower lateral end, to the vicinity of which a second lower connecting rod is connected by means of a second connection;
- the chassis comprises a first lower lateral end, to the vicinity of which the first lower connecting rod is connected by means of a third connection, and a second lower lateral end to the vicinity of which the second lower connecting rod is connected by means of a fourth connection;
- at least the two connections connecting the two lower connecting rods to the cutting device each comprise an elastic member;
- at least the two connections connecting the lower connecting rods to the chassis each comprise an elastic member;
- there is a stabilizing device which at least substantially prevents the cutting device from moving transversely to the direction of forward travel;
- the stabilizing device consists of one of the lower connecting rods of which the connection connecting it to the cutting device or to the chassis comprises a second elastic element so that the two elastic elements form a connection of the pivot type.

BRIEF DESCRIPTION OF THE DRAWINGS

Other objects, features and advantages of the invention will become apparent in the following description with reference to the appended drawings which, by way of nonlimiting example, depict one embodiment of the cutting machine according to the invention.

In these drawings:

FIG. 5 depicts one end of a single connecting rod in cross section;

FIG. 6 depicts an elastic element with a corresponding ring.

DESCRIPTION OF THE PREFERRED EMBODIMENTS

Figure 1:
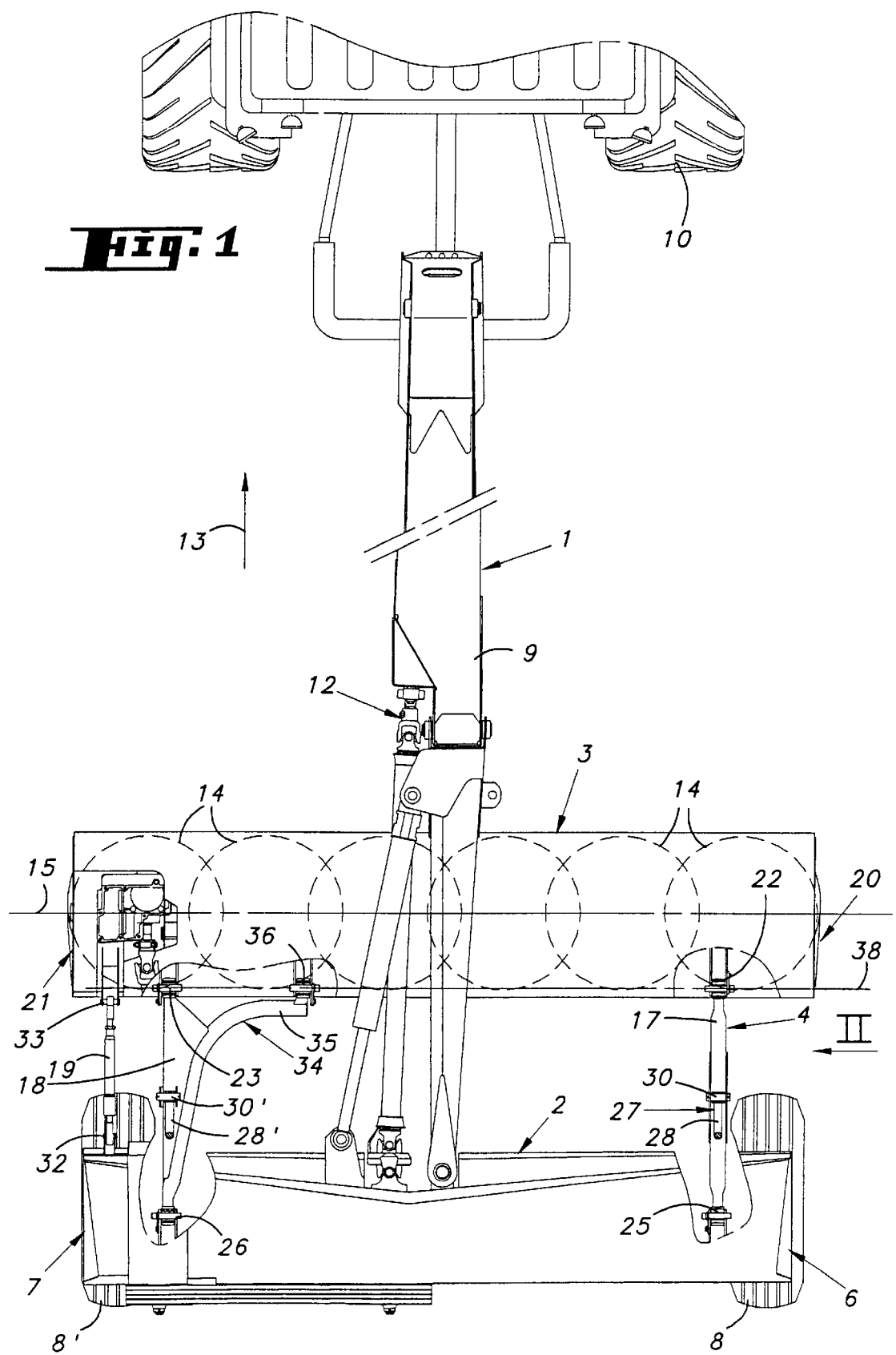
FIG. 1 depicts a top view of a cutting machine which shows a number of part sections.

FIG. 1 shows a cutting machine 1 comprising, according to the embodiment depicted, a chassis 2 and a cutting device 3 connected to said chassis 2 by means of a connecting device 4.

At each of its lateral ends 6, 7 the chassis 2 comprises a wheel 8, 8' by means of which wheels it rests on the ground S. Connected in the vicinity of the central part of the chassis 2 is a drawbar 9 which allows the chassis 2 to be connected to a motor vehicle 10 which is intended, on one hand, to drive the cutting device 3 by means of a drive device 12 and, on another hand, to move the cutting machine 1 along in the direction of forward travel 13.

In the description which follows, the ideas of "front", "rear", "in front of" and "behind" are defined with respect to this direction of forward travel 13 and the ideas of "right" and "left" are defined when looking at the cutting machine 1 from behind in the direction of forward travel 13.

According to the embodiment depicted, the cutting device 3 is intended to cut a standing product. To do this, the cutting device 3 includes several cutting elements 14 arranged one beside the next in a line 15 which is transverse to the direction of forward travel 13 and each of which is intended to be driven in rotation about an upwardly extending axis by means of a drive device 12.

This cutting device 3 is intended to occupy a transport position in which it extends above the ground S and a work position in which said cutting device 3 at least approximately rests on the ground S. To cut the standing product correctly, the cutting device 3 has to follow the relief of the land. For this purpose, the connecting device 4, according to the embodiment depicted, comprises a first lower connecting rod 17, a second lower connecting rod 18 and a top connecting rod 19. From FIG. 1, it may be seen that the cutting device 3 also comprises a first lower lateral end 20 and a second lower lateral end 21, which are located in front of the corresponding lower lateral ends 6, 7 of the chassis 2.

From FIG. 1, it may also be seen that the first connecting rod 17 is connected to the vicinity of the first lower lateral end 20 of the cutting device 3 by means of a first connection 22 and that the second connecting rod 18 is connected to the vicinity of the second lower lateral end 21 of said cutting device 3 by means of a second connection 23.

The first lower connecting rod 17 is also connected to the vicinity of the first lower lateral end 6 of the chassis 2 by means of a third connection 25 and the second lower connecting rod 18 is furthermore connected to the vicinity of the second lower lateral end 7 of the chassis 2 by means of a fourth connection 26. From FIG. 1, it may also be seen that the two lower connecting rods 17, 18 extend approximately parallel to each other and in the direction of forward travel 13.

To bring the cutting device 3 from the transport position into the work position or vice versa, the cutting machine 1 comprises an operating device 27 which, in the embodiment depicted, comprises two rams 28, 28'.

According to the embodiment depicted, each ram 28, 28' is connected, on one hand, to the corresponding lower lateral end 6, 7 of the chassis 2 by means of a first articulation 29, 29' (the articulation 29' not being depicted) and, on another hand, connected to the corresponding lower connecting rod 17, 18 located at the corresponding lower lateral end 20, 21 of the cutting device 3 by means of a second articulation 30, 30'.

Figure 2:
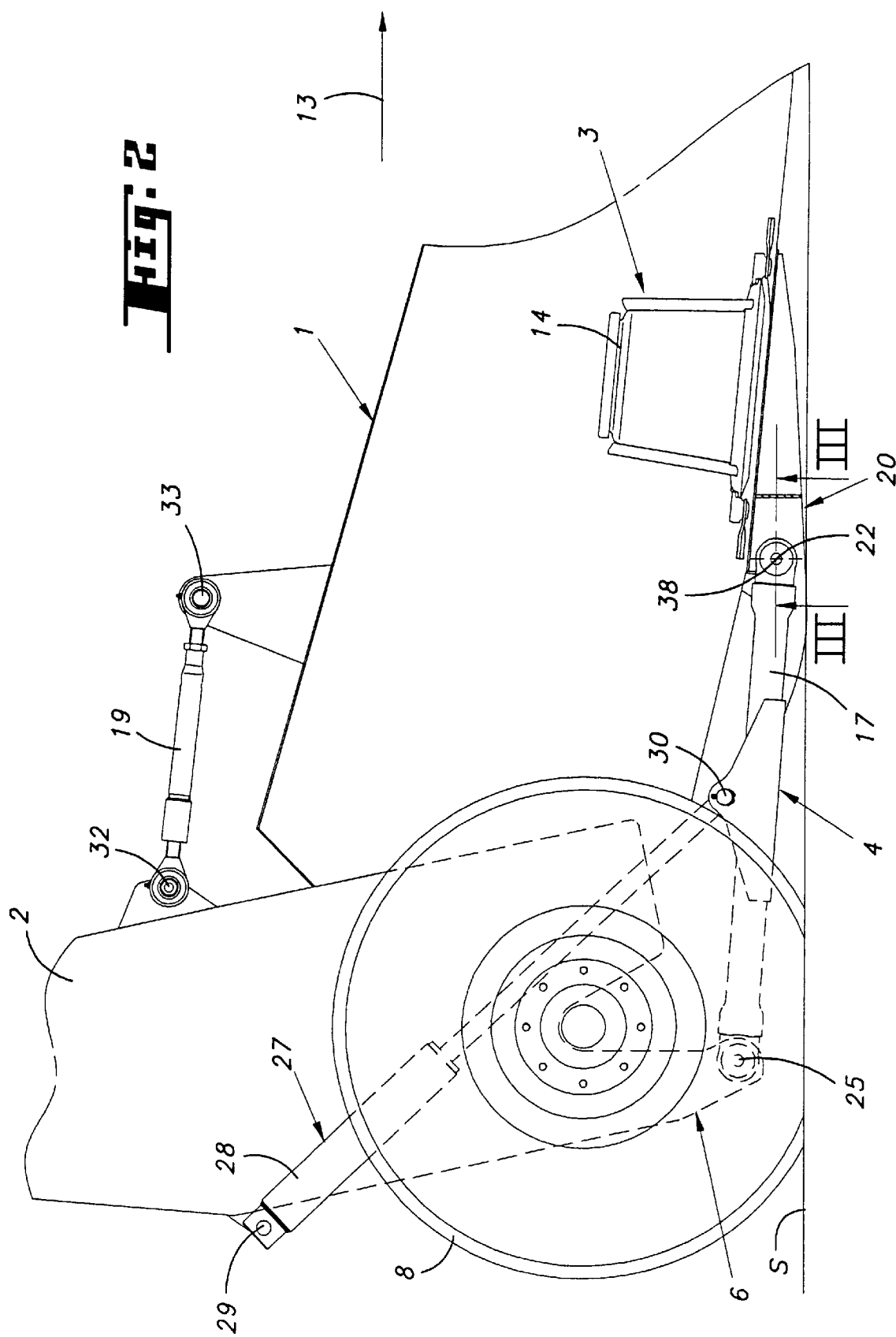
FIG. 2 is a side view in the direction of arrow II defined in FIG. 1.

In FIG. 2, it may be seen that the second articulation 30 connecting the ram 28 to the first lower connecting rod 17 is located approximately midway between the first connection 22 and the third connection 25 described hereinabove.

It will be noted that the other ram 28' is connected to the second lower connecting rod 18 in the same way. When the operator operates the operating device 27, the rams 28, 28' shorten and this has the effect of pivoting the lower connecting rods 17, 18 upwards about their respective connection 25, 26 and therefore of lifting the cutting device 3 clear of the ground S using the top connecting rod 19 which prevents said cutting device 3 from pivoting excessively about the articulations 22, 23. To achieve this, the top connecting rod 19 is located higher up than the lower connecting rods 17, 18 and is connected, on one hand, to the chassis 2 by means of a third articulation 32 of the ball-joint type and, on another hand, to the cutting device 3 by means of a fourth articulation 33 which is also of the ball-joint type.

From FIG. 1, it will be seen that there is also a stabilizing device 34 which at least substantially prevents the cutting device 3 from moving transversely to the direction of forward travel 13. For this purpose, there is a third lower connecting rod 35 which is, on one hand, fixed to the second lower connecting rod 18 and which, on another hand, is connected to the cutting device 3 by means of a fifth connection 36.

It will be noted that this fifth connection 36 is located between the second connection 23 and the first connection 22 and that these three connections 22, 23, 36 are aligned in an approximately horizontal straight line 38 at right angles to the direction of forward travel 13. This stabilizing device 34 therefore consists mainly of the second lower connecting rod 18 and the third lower connecting rod 35.

It will be noted that, in this embodiment depicted, the connections 22, 23, 25, 26, 36 are connections of the ball-joint type, each comprising a respective elastic element. These connections 22, 23, 25, 26, 36 are at least approximately identical and, for reasons of clarity, only the first connection 22 will be described further in detail.

Figure 3:
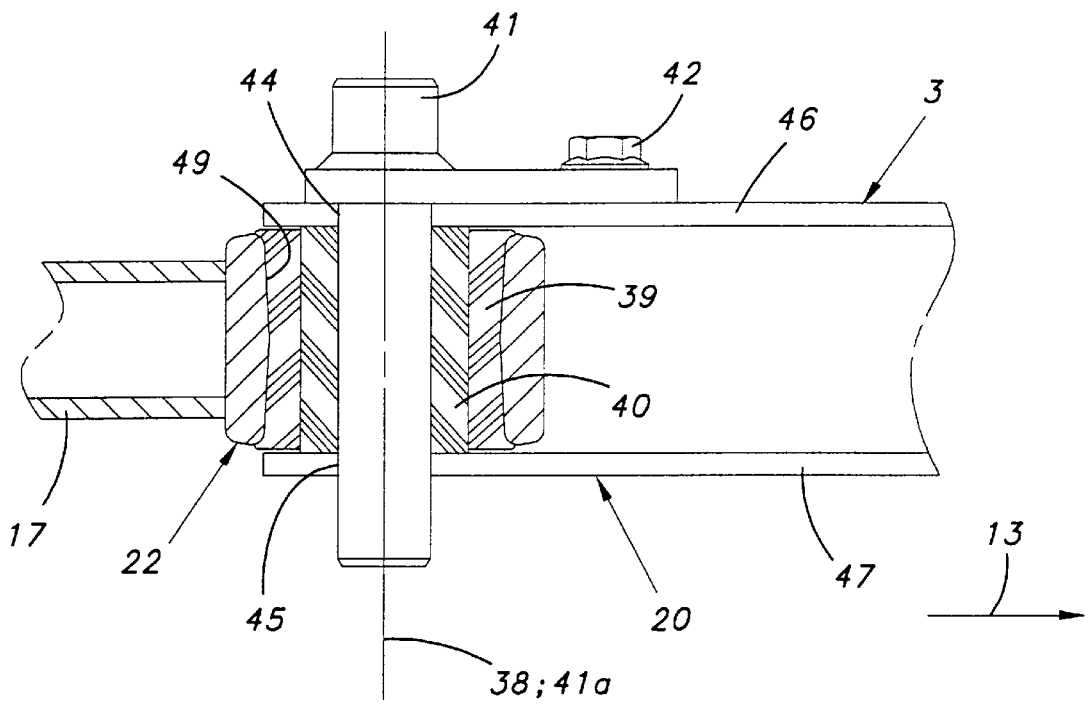
FIG. 3 is a part section on the plane III—III defined in FIG. 2.
Figure 4:
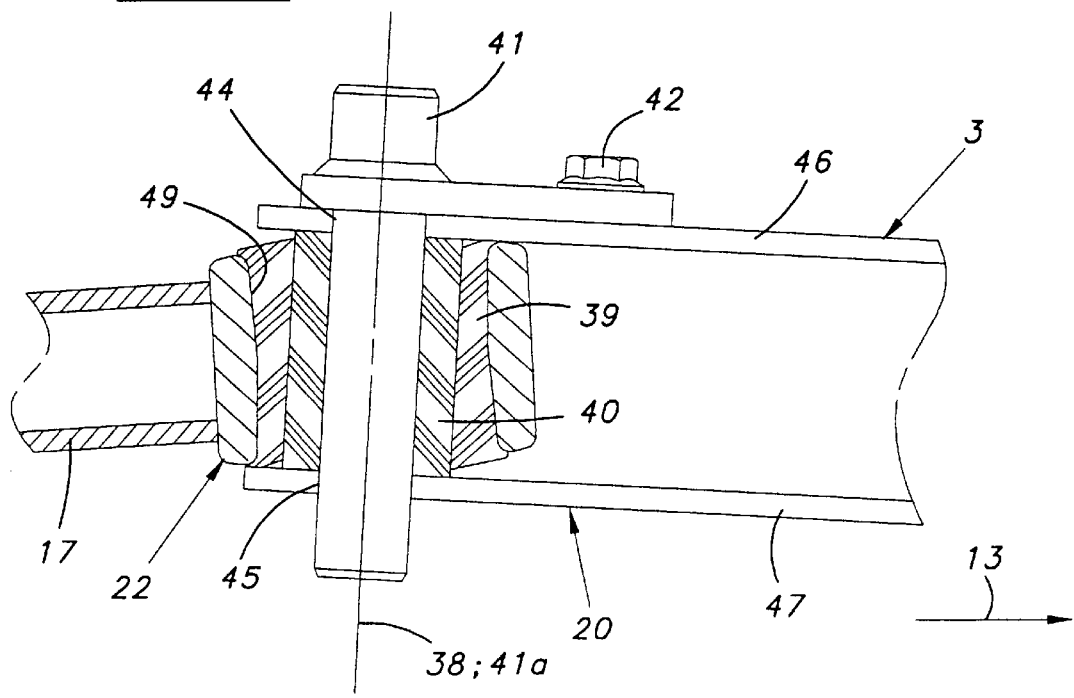
FIG. 4 depicts the same elements as FIG. 3, in a different position.

To this end, FIGS. 3 and 4 show the first connection in section. This first connection 22 comprises, as described hereinabove, an elastic element 39 which may be made of natural or synthetic elastomer. This first connection 22 also comprises a plastic ring 40 of cylindrical shape, on the outside of which the elastic element 39 is fixed by vulcanizing and through which there extends a spindle 41 of longitudinal axis 41a and made of a rustless material.

Between the spindle 41 and the ring 40 is a small operating clearance which allows a relative movement (in this instance, a pivoting movement) between said ring 40 and said spindle 41. This pivoting between the ring 40 and the spindle 41 allows the first lower connecting rod 17 and the second lower connecting rod 18 to pivot about respective longitudinal axes 41a and thus allows the cutting device 3 to be brought into the work position and into the transport position.

A plastic ring 40 such as this, through which a spindle 41 made of rustless material, such as, for example, a chromium spindle, extends, advantageously allows this first connection 22 to perform very well, have good durability and require no maintenance, thus making it always possible for the cutting device 3 to be brought into a work position and into a transport position and allowing this cutting device to adapt appropriately to the ground S.

From FIGS. 3 and 4, it may also be seen that the spindle 41 is fixed to the cutting device 3 by means of a screw 42 and that said spindle 41 extends through two holes 44, 45 made in two flanges 46, 47 of said cutting device 3. The ring 40, for its part, extends between the two flanges 46, 47 which form a fork.

The elastic element 39 is housed in a corresponding bore 49 made in the first lower connecting rod 17. For this purpose, it can be seen from FIG. 5 that the bore 49 is of biconical shape, the smallest inside diameter 50 of which being located at least approximately at the centre of said bore 49. This bore 49 made in the first lower connecting rod 17 may be forged or cast in depending on the way in which said first lower connecting rod 17 is made, thus advantageously making it possible to reduce the cost price of the first connection 22 considerably.

FIG. 6 only shows the elastic element 39 and the ring 40. It will be noted that on its external periphery 51 the elastic element 39 is of biconical shape approximately complementing the biconical shape of the corresponding bore 49 in the first lower connecting rod 17. The smallest outside diameter 52 of the biconical shape of the elastic element 39 is at least approximately at the centre of said elastic element 39. Such biconical shapes of the bore 49 and of the elastic element 39 allow said elastic element 39 to be fixed sufficiently to the first lower connecting rod 17 when said elastic element 39 and the corresponding ring 40 are mounted in the bore 49 in the first lower connecting rod 17.

It will be noted that, when the elastic element 39 and the ring 40 are removed from the first lower connecting rod 17, the outside diameter D of said elastic element 39 is significantly larger than the inside diameter d of the bore 49. Thus, the elastic element 39 and the ring 40 are mounted in the bore 49 of the first lower connecting rod 17, for example as a press fit. Each connection 22, 23, 25, 26, 36 thus, by means of the corresponding elastic element 39, allows a relative movement of the swivelling type of the corresponding lower connecting rod 17, 18, 35 with respect to the corresponding flanges 46, 47 of the chassis 2 and of the cutting device 3. For this purpose, during such a relative movement, the elastic element 39 deforms as shown in FIG. 4. Each connection 22, 23, 25, 26, 36 therefore on one hand allows a pivoting movement of the corresponding lower connecting rod 17, 18, 35 with respect to the chassis 2 and with respect to the cutting device 3 about the longitudinal axis 41a of the corresponding spindle 41 and, on another hand, allows a swivelling movement of said lower connecting rod 17, 18, 35 with respect to said chassis 2 and with respect to said cutting device 3.

It will, however, be noted that the second connection 23 connecting the second lower connecting rod 18 to the cutting device 3 and the fifth connection 36 connecting the third lower connecting rod 35 to said cutting device 3 each comprise, as described hereinabove, a respective elastic element 39 but together form a connection of the pivot type of longitudinal axis 41a, 38. This connection of the pivot type prevents the cutting device 3 from drifting transversely with respect to the direction of forward travel 13.

Finally, various modifications remain possible, particularly as regards the construction of the various elements or by substituting technical equivalents, without thereby departing from the field of protection defined by the claims.

In particular, it is perfectly possible to equip the connections 22, 23, 25, 26, 36 with a spindle which is only surface-coated with a rustless material, thus advantageously allowing the cost price of said connections 22, 23, 25, 26, 36 to be lowered.

It is also perfectly possible to arrange the third lower connecting rod 35 of the stabilizing device 34 in some other way in order to obtain the same effect. Thus, it is, for example, perfectly possible to, on one hand, fix the third lower connecting rod 35 to the second lower connecting rod 18 and, on another hand, to connect the third lower connecting rod 35 to the chassis 2 by means of another connection.

What is Claimed as New and Desired to be Secured by Letters Patent of the United States is:

1. A cutting machine comprising:

a chassis connected to a motor vehicle;

a cutting device comprising cutting members and intended to occupy:
   at least one work position in which said cutting device rests on a ground and in which it follows a relief of said ground,
   at least one transport position in which said cutting device extends above said ground, a connecting device connecting the cutting device to the chassis in such a way as to allow said cutting device to be brought into the work position and into the transport position, said connecting device comprising at least two connecting rods, each connecting rod being connected to said cutting device and to said chassis by means of a respective connection, one of said connections being a connection of a ball-joint type, and at least one of the connections comprising an elastic element;

wherein at least one of the connections which comprises an elastic element also comprises a ring, wherein the elastic element is fixed to the outside of said ring, and wherein a spindle extends through said ring;

wherein the ring is made of plastic and the spindle is made of a rustless material.

2. The cutting machine according to claim 1, wherein the elastic element is made of an elastomer.

3. The cutting machine according to claim 1, wherein the elastic element is fixed to the ring by vulcanizing.

4. The cutting machine according to claim 1, wherein each connecting rod comprises a bore of biconical shape, inside which the elastic element extends.

5. The cutting machine according to claim 4, wherein an exterior periphery of the elastic element is of biconical shape, approximately complementing the biconical shape of the bore in the connecting rod.

6. The cutting machine according to claim 4, wherein the bore made in the connecting rod is forged in.

7. The cutting machine according to claim 4, wherein the bore made in the connecting rod is cast in.

8. The cutting machine according to claim 1, wherein there is provided a stabilizing device which prevents the cutting device from moving transversely to a direction of forward travel.

9. The cutting machine according to claim 1, wherein the cutting device comprises:

a first lower lateral end, in a vicinity of which a first lower connecting rod is connected by means of a first connection;

a second lower lateral end, in a vicinity of which a second lower connecting rod is connected by means of a second connection.

10. The cutting machine according to claim 9, wherein at least the two connections connecting the two lower connecting rods to the chassis each comprises an elastic element.

11. The cutting machine according to claim 9, wherein:

there is a stabilizing device which prevents the cutting device from moving transversely to a direction of forward travel;

the stabilizing device consists of one of the lower connecting rods of which the connection connecting it to the chassis comprises a second elastic element so that the two elastic elements form a connection of a pivot type.

12. The cutting machine according to claim 9, wherein the chassis comprises:

a first lower lateral end, in a vicinity of which the first lower connecting rod is connected by means of a third connection;

a second lower lateral end, in a vicinity of which the second lower connecting rod is connected by means of a fourth connection.

13. The cutting machine according to claim 12, wherein at least the two connections connecting the two lower connecting rods to the cutting device each comprise an elastic element.

14. The cutting machine according to claim 12, wherein:

there is a stabilizing device which prevents the cutting device from moving transversely to a direction of forward travel;

the stabilizing device consists of one of the lower connecting rods of which the connection connecting it to the cutting device comprises a second elastic element so that the two elastic elements form a connection of a pivot type.

* * * * *